US006131767A

United States Patent [19]

Savage et al.

[11] Patent Number: 6,131,767

[45] Date of Patent: Oct. 17, 2000

[54] TAP FOR DISPENSING FLUID

[75] Inventors: Chester Savage, Irvine; Rocklin Verespej, San Clemente, both of Calif.

[73] Assignee: Scholle Corporation, Irvine, Calif.

[21] Appl. No.: 09/149,969

[22] Filed: Sep. 9, 1998

[51] Int. Cl.$^{7}$ .................................................. G01F 11/00

[52] U.S. Cl. ......................... 222/1; 222/105; 222/153.07; 222/185.1

[58] Field of Search .......................... 222/1, 105, 153.07, 222/185.1, 517, 518, 541.9

[56] References Cited

U.S. PATENT DOCUMENTS

| | | | |
|---|---|---|---|
| 4,420,089 | 12/1983 | Walker et al. | 222/153.07 |
| 4,589,577 | 5/1986 | Welsh et al. | 222/518 |
| 4,671,436 | 6/1987 | Hagan | 222/518 |
| 4,739,903 | 4/1988 | Bedwell et al. | 222/105 |
| 4,784,296 | 11/1988 | Bullock | 222/153.07 |
| 4,848,600 | 7/1989 | Dark | 222/518 |
| 5,794,823 | 8/1998 | Roundtree | 222/518 |
| 5,947,343 | 9/1999 | Horstmann | 222/517 |

FOREIGN PATENT DOCUMENTS

| | | | |
|---|---|---|---|
| 2177185 | 1/1987 | United Kingdom | 222/518 |

*Primary Examiner*—Joseph A. Kaufman
*Attorney, Agent, or Firm*—Terry L. Miller

[57] ABSTRACT

A liquid-dispensing tap includes a tap body which is mountable to a container holding liquid, a seal member disposed within the tap body, and an actuator connected to the seal member. The actuator is pivotally disposed on the tap body so that when pivoted by a user, a seal formed between the seal member and the tap body is disengaged, allowing liquid within the container to dispense. The actuator may be pivoted in any number of predetermined directions. The tap may be manufactured and assembled to consist essentially of only the tap body, the seal member, and the actuator, thereby eliminating many other elements commonly found in conventional taps.

38 Claims, 9 Drawing Sheets

FIG. 1.
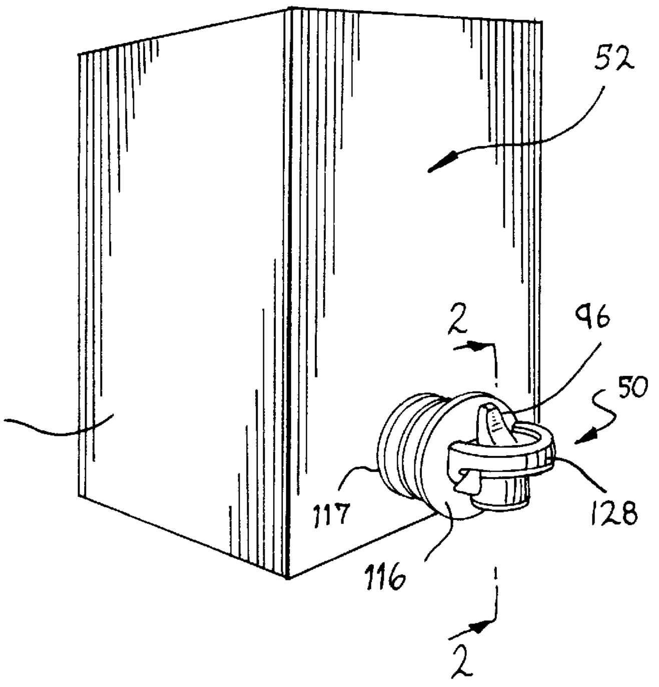
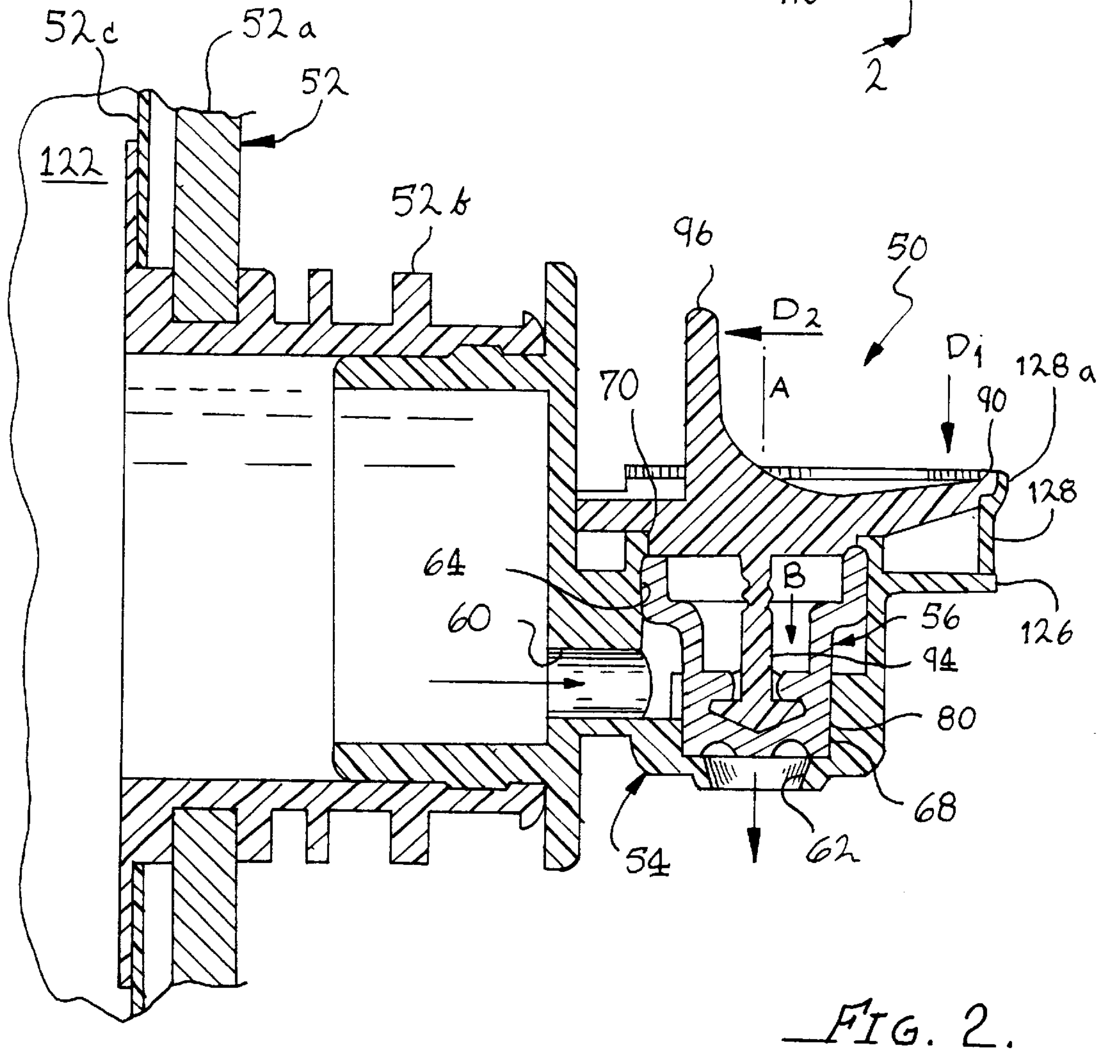
FIG. 2.

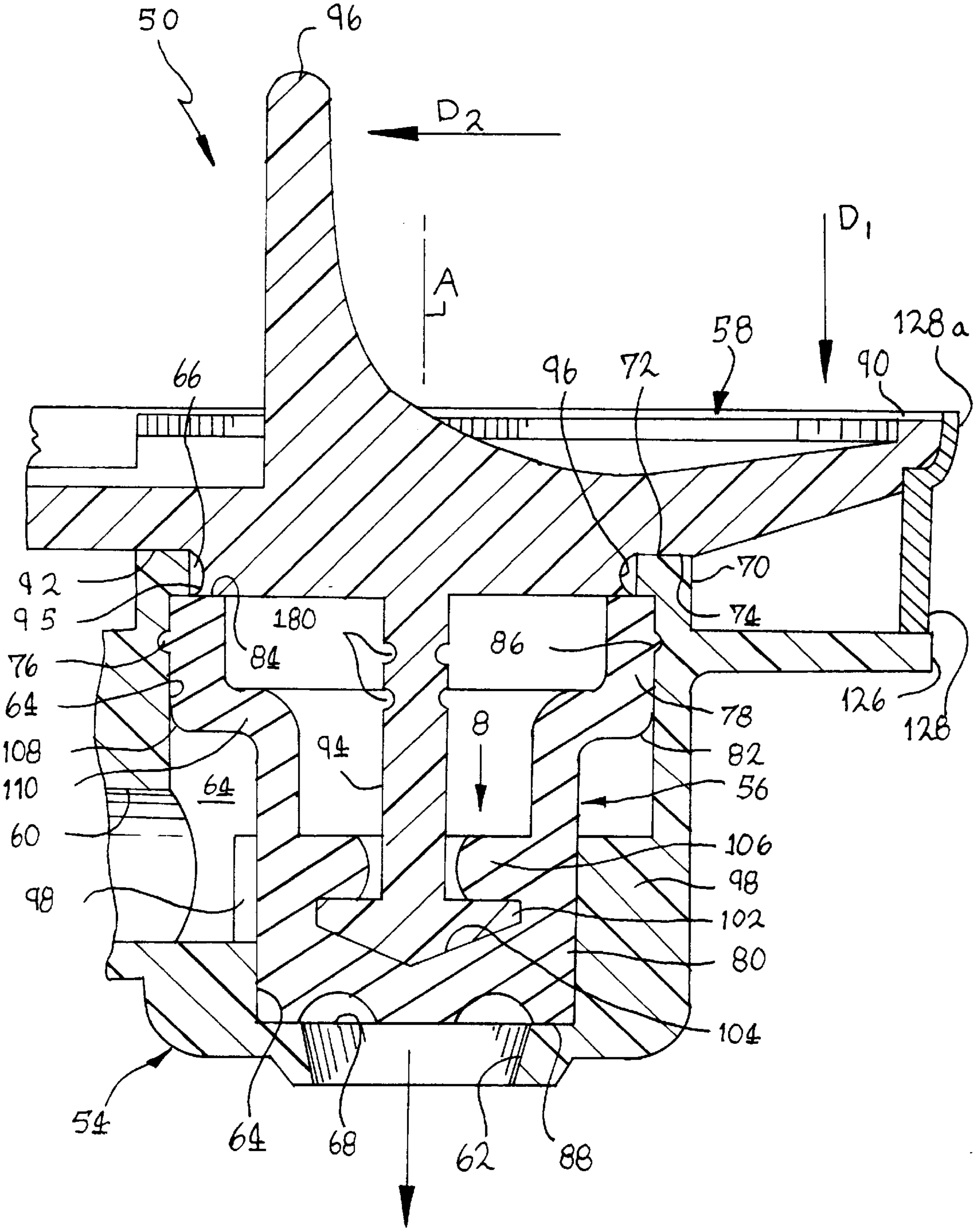
FIG. 2-L.

FIG. 4.
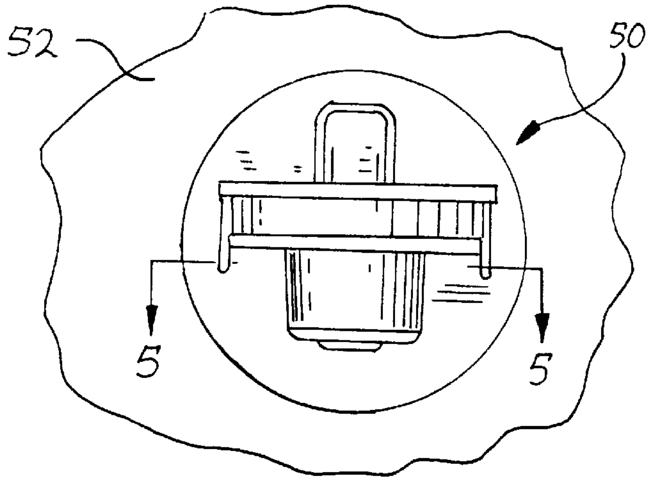
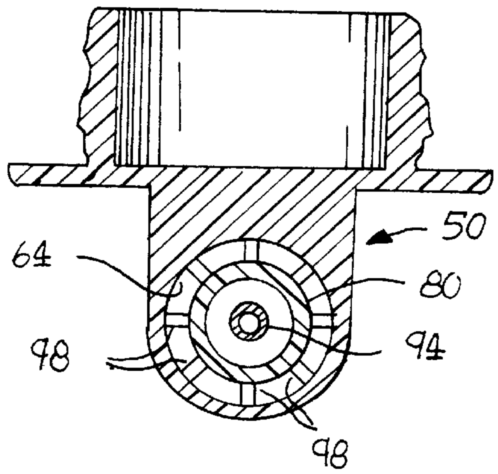
FIG. 5.
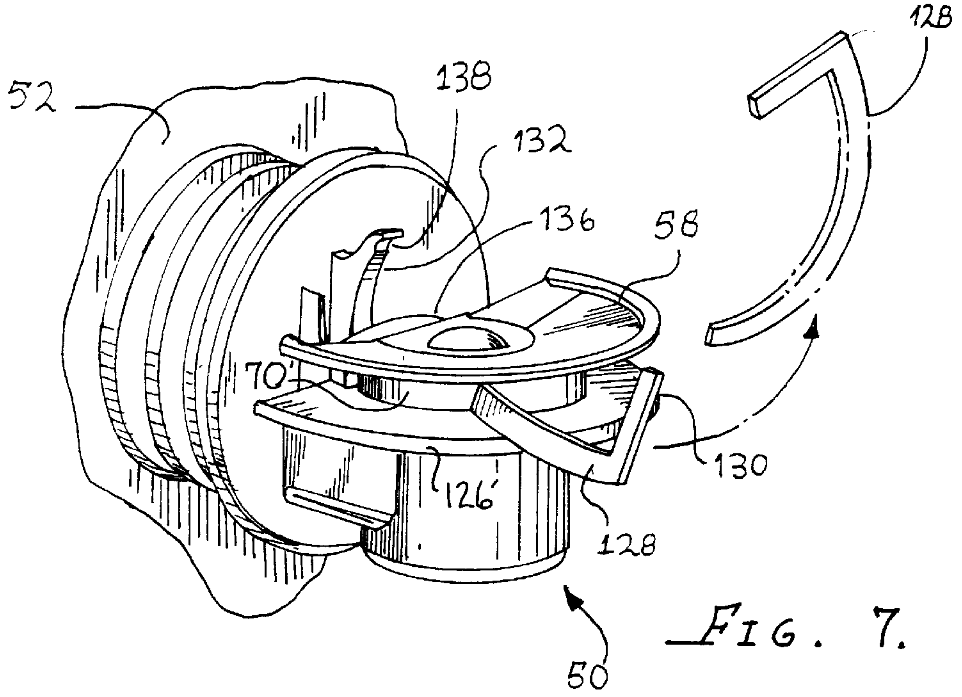
FIG. 7.

TAP FOR DISPENSING FLUID

BACKGROUND OF THE INVENTION

1. Field of the Invention

The present invention relates to a tap (i.e., a dispensing valve or spigot) for dispensing fluids and liquids. More particularly, the present invention relates to a tap used for dispensing liquid from a container. The present inventive tap may preferably be used to dispense a liquid, such as wine for example, from a box-like container in which the wine is packaged for transportation and sale.

2. Related Technology

There are many applications in which liquids are dispensed from containers. One common application is known in the commercial consumer market in which wine is packaged in a box-like container made of paper board and having a collapsible inner bag which serves to hold the wine. A tap is attached to the bag by use of a fitting that is sealingly attached to the bag and also sealingly interfaces with the body of the tap. The tap has a manually-engageable tab which may be moved manually by a finger. When the tab is raised manually, wine within the container dispenses through an opening of the tap below the tab. One of the drawbacks of this type of tap is that the liquid is dispensed forwardly from the front of the tap immediately below the tab, rather than downwardly directly below the tap. Thus, the user needs to exercise caution to prevent spillage when dispensing liquid from such a tap in order to ensure that the liquid goes into a container held below and somewhat in front of the tap, rather than going forwardly of the tap and over a container held directly below the tap.

Conventional taps may be unduly complicated, such as those disclosed in U.S. Pat. Nos. 3,904,174 and 4,044,998. These patents disclose a conventional tap assembly including a tap body having a tap chamber with a seat. A valve element in the form of a resilient cup member engages the seat. A compression spring continually biases a valving edge portion of the cup member toward the seat. A bonnet handle engages cam surfaces of the tap body to actuate the tap by lifting the valving edge off the seat. Some of the drawbacks of such a tap assembly include both the large number of parts used to produce the tap assembly, and the detailed structure of these parts. For example, the tap includes a compression spring, a bonnet, cam surfaces, and other parts and features, which all increase the complexity and the cost of producing such tap assemblies. This expense results in undue waste for many commercial applications of such tap assemblies, in which single-used packaging including the tap, is discarded after the product from the package is used. That is, the container is not refillable, and is thrown away, including the tap attached to the container.

Many conventional taps also do not have a pleasant tactile "feel" during use. That is, the user of the tap does not have a definite feeling obtained through the fingers actuating the conventional tap, that the tap is opened crisply and positively, and that it closes definitely when the user releases the manual actuating force on the tap.

SUMMARY OF THE INVENTION

In view of the foregoing an object of the present invention is to overcome one or more of the drawbacks of conventional fluid-dispensing taps.

Another object of the present invention is to provide a tap for dispensing fluid which is relatively simplified in design, and uncomplicated to produce.

Still another object of the present invention is to provide a liquid-dispensing tap with few components.

A tap for dispensing liquid from a container in accordance with the present invention includes a tap body defining a fluid flow path extending within the tap body and communicated between an inlet and outlet, the tap body defines a valving chamber along this flow path, and a seat intermediate of the inlet and outlet, a seal member disposed within the tap body, and an actuator is pivotally disposed on the tap body and coupled to the seal member. When the actuator is pivoted, the seal member moves from a closed position sealingly engaging the seat to an opened position, allowing liquid to dispense from the outlet. When the actuator is released, the seal member returns to the closed position due to its own resilience.

Accordingly, with only three components, and no metallic springs, the tap of the present invention is self closing, and is able to controllably dispense liquid. A tap embodying the present invention is also relatively easy and inexpensive to produce.

Further, the tap body includes an inlet in communication with the container and an outlet through which the liquid dispenses. A recess is formed within the tap body between the inlet and the outlet and forms a valving chamber in cooperation with a seal member. The recess includes an opening and a dispensing seat defined around a part of the flow path leading to the outlet. A shoulder is formed around the opening and has a top surface, a bottom surface, and a retaining seat defined by the bottom surface. The seal member is disposed with the recess and includes a base portion, a sealing portion, and a resilient portion. The base portion is sealingly received against the retaining seat of the shoulder. The sealing portion releasably engages the dispensing seat of the recess. The resilient portion is positioned between the base portion and the sealing portion and provides an integral bias force to urge the sealing portion against the dispensing seat while also allowing the sealing portion to be moved off of the seat for dispensing of fluid from the tap.

Preferably, the actuator of the tap includes a handle which is movable in at least one predetermined direction, and a pivotal seat disposed on the top surface of the shoulder. A stem couples the actuator to the sealing portion of the seal member. The stem is flexible or includes a hinging feature to allow bending of the stem as the actuator is pivoted. For example, the stem may include a living hinge section, or alternatively, might include a hinge or ball-and-socket joint. The actuator is pivoted when the handle is rocked or pivoted by a user in the predetermined direction (i.e., in any one of several possible vertical planes). Thus, the shoulder of the tap body provides a fulcrum for the pivotal seat—the position of which may vary in dependence upon the position of manual contact and actuation force applied by a user to the actuator in order to open the tap. The direction of rocking of the actuator on the tap body corresponds to the location of this fulcrum. In each case, the stem pulls the sealing portion away from the dispensing seat, against the inherent bias force of the resilient portion, thereby allowing liquid to flow from the inlet through the outlet.

One of the advantages of the present invention is that the tap may be manufactured with essentially only three primary elements. That is, the tap body, the seal member, and the actuator; thereby eliminating many of the parts which complicate conventional taps. Therefore, the tap of the present invention may be more easily and less expensively produced than conventional taps. Because of this low production cost, the tap is economically disposable. Accordingly, the inventive tap may be economically applied in many consumer or retail applications, such as those in which a liquid is packaged in a single-use bag-in-box container which is discarded after the container is emptied.

According to one aspect of the invention, the recess of the tap body may further include a plurality of ribs for constraining the seal member in such a manner that the sealing portion moves in a substantially axial direction when the handle is actuated, and regardless of the direction of the rocking of this handle portion of the tap. The plurality of ribs are in a circumferentially spaced relationship to allow liquid to flow between these ribs from the inlet to the outlet when the seal member is in the opened position.

According to another aspect of the invention, the resilient portion of the seal member may include a first bend positioned below the base portion and a second bend positioned between the first bend and the sealing portion (when considered in cross section—these bends are defined by respective annular portions of the seal member). The first bend is configured to bend in a first direction and the second bend is configured to bend in a second direction when the stem pulls the sealing portion away from the dispensing seat. The first and second bends allow the resilient portion to distort while decreasing in length and also remaining entirely within the tap body. Further, because of its inherent resiliency, the resilient portion continually provides a bias force, particularly when distorted by opening of the tap. The seal member is preferably a unitary resilient element, which eliminates the need for a separate metallic spring, in contrast to common or conventional dispensing taps which generally do include a metallic spring.

According to another aspect of the invention, the shoulder of the tap body may have either an circular configuration or a rectangular configuration. The pivotal seat of the actuator may then be configured in a manner complementary to that of the shoulder. In either embodiment, the top surface of the shoulder provides a fulcrum about which the actuator is pivotal on the pivotal seat. In the circular embodiment, the handle is movable in any predetermined direction, which may be selected along a 360° horizontal sweep about a central axis of the tap. In an embodiment having a rectangular shoulder, the handle is movable in predetermined directions which are orthogonal with each other. An advantage which results from these alternative embodiments of the tap is an easy-to-use tap which may be more ergonomic than conventional taps, and is not constrained to conventional actuation procedures or methods.

Other objects, features, and advantages of the present invention will become apparent to those skilled in the art from a consideration of the following detailed description taken in conjunction with the accompanying drawings.

BRIEF DESCRIPTION OF THE DRAWING FIGURES

FIG. 1 is a perspective view of an exemplary liquid-dispensing tap in a locked condition, and mounted to a bag-in-box container in accordance with the present invention;

Figure 2A:
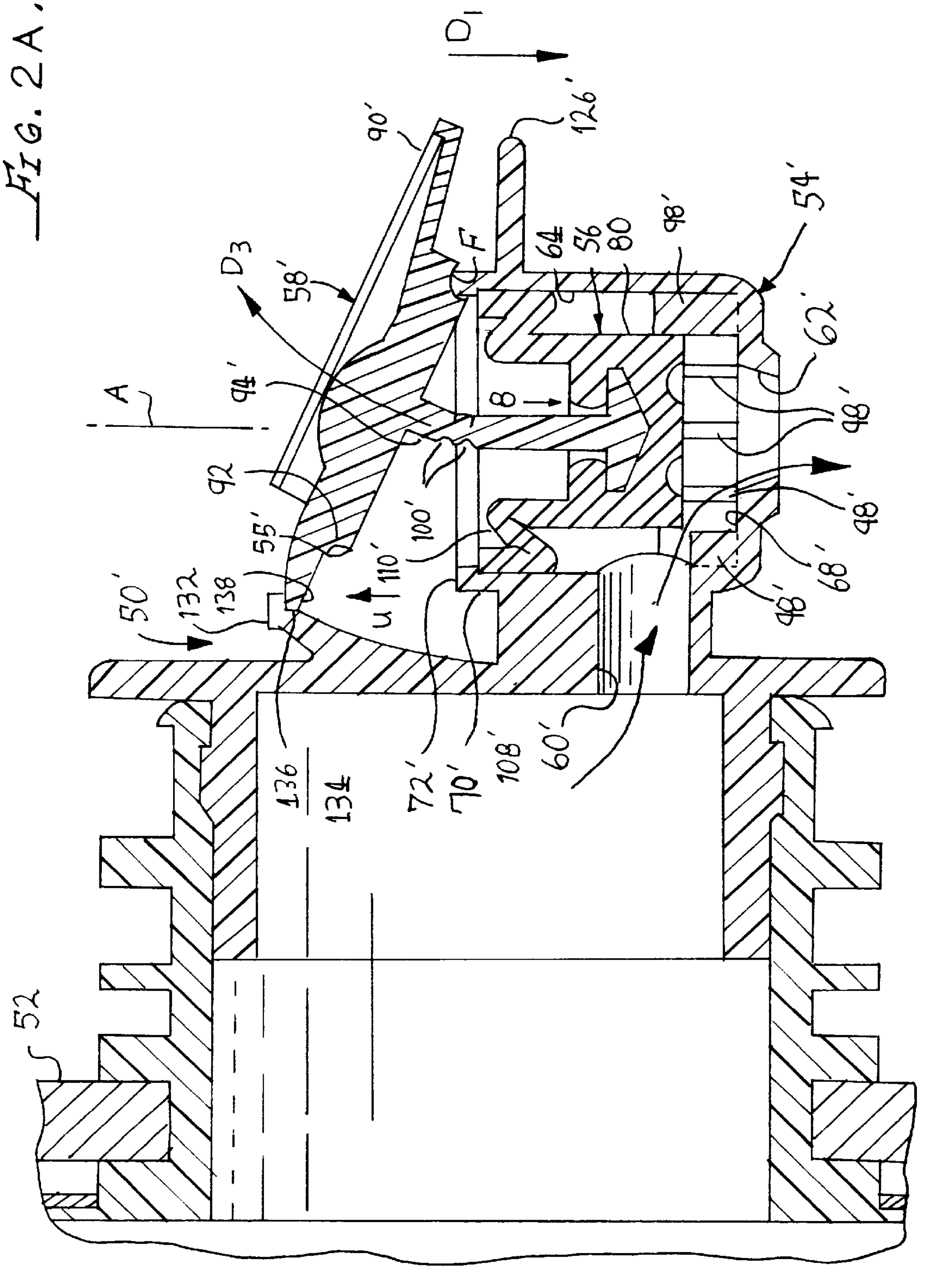
FIG. 2 is a cross-sectional view of an exemplary tap taken along line 2—2 of FIG. 1, particularly illustrating the tap when locked, closed and preventing liquid from dispensing.
Figure 6:
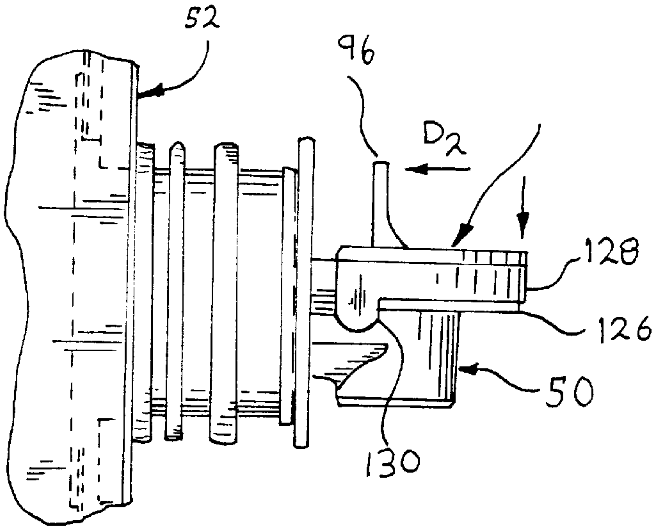
Figure 3:
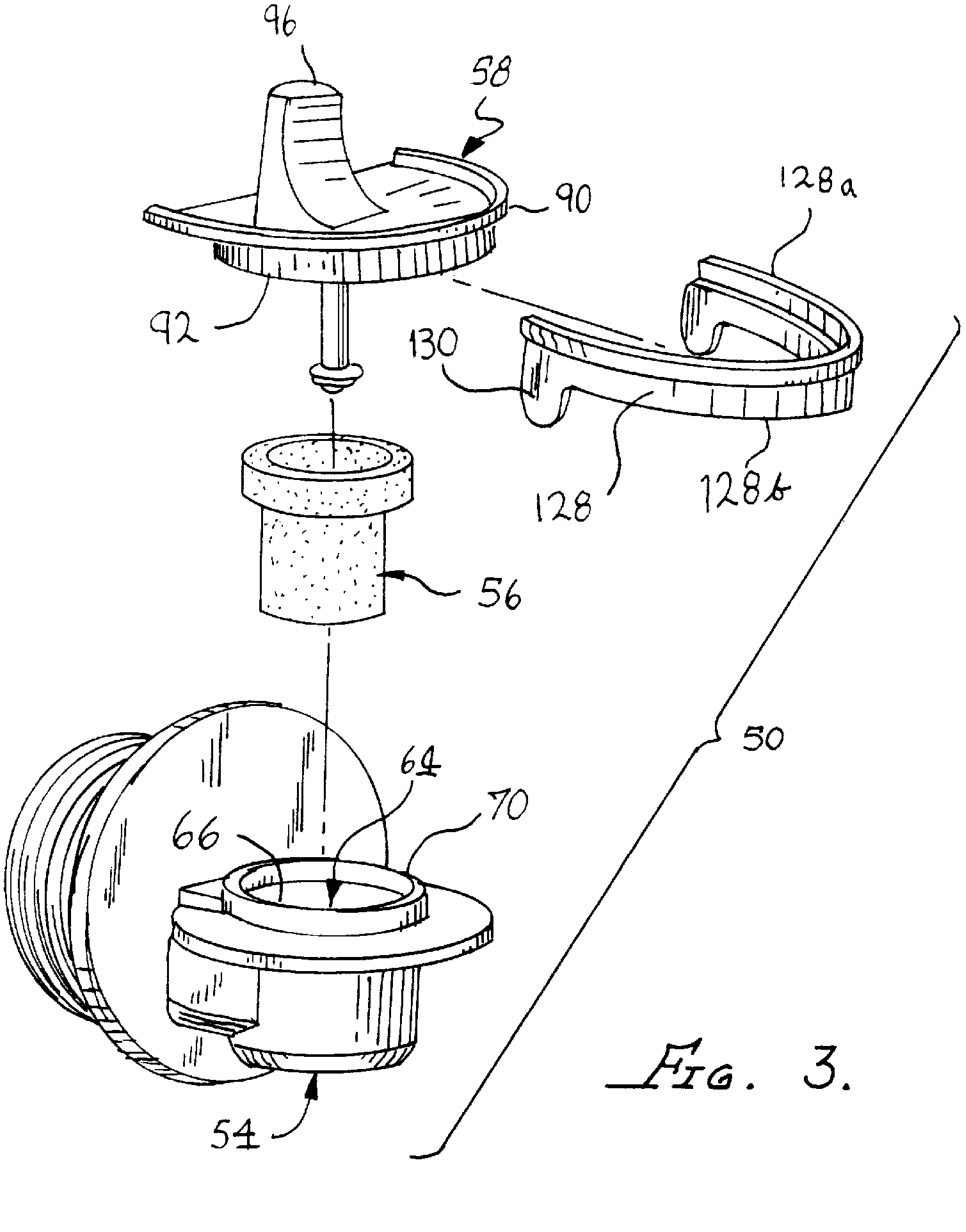
Figure 8:
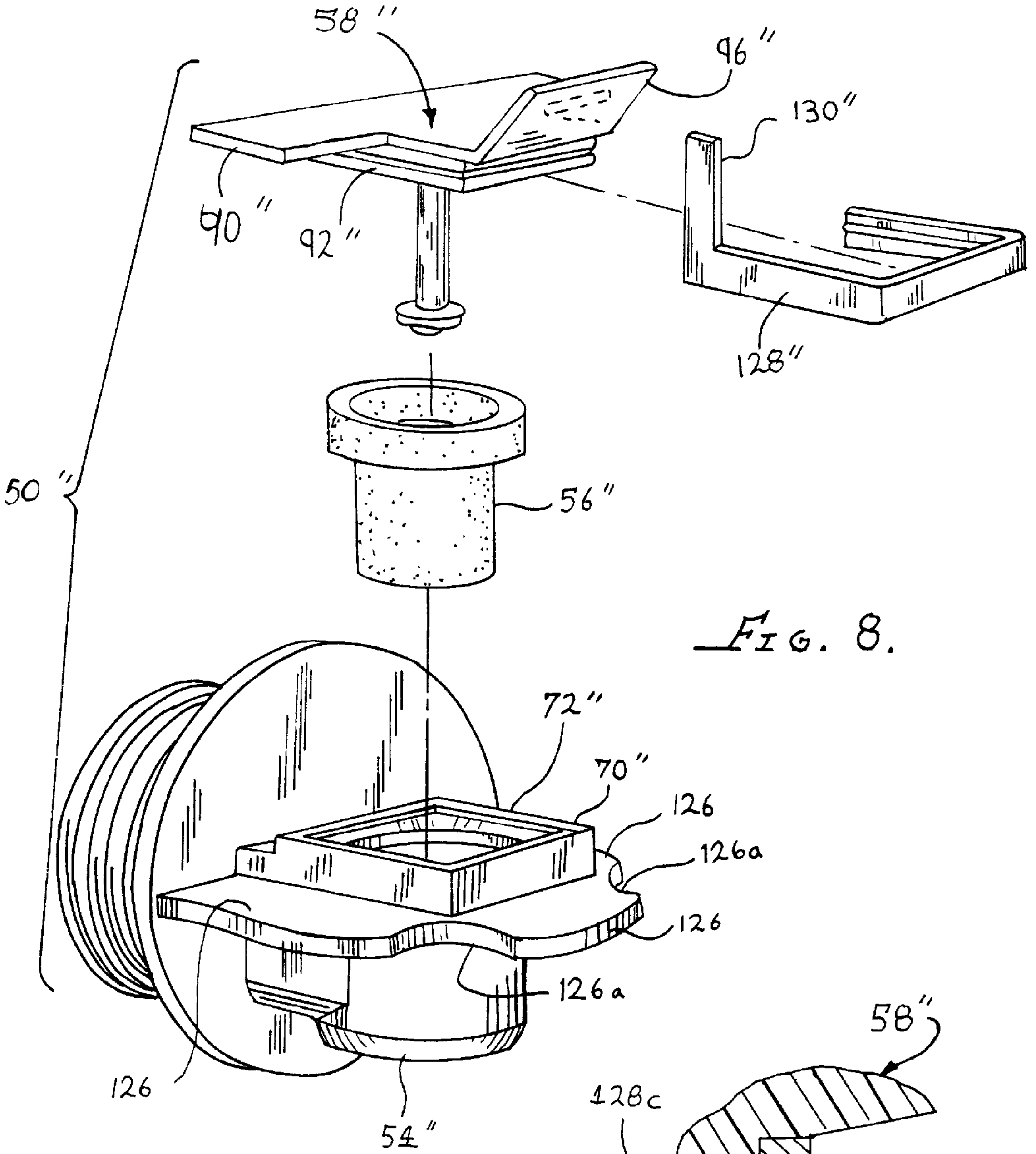
Figure 14:
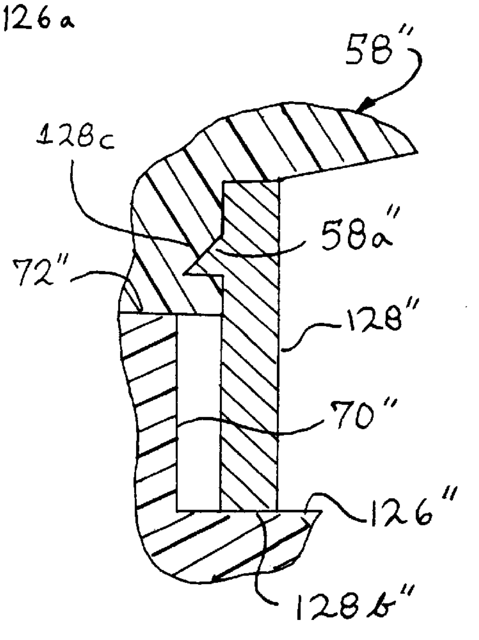
Figure 9:
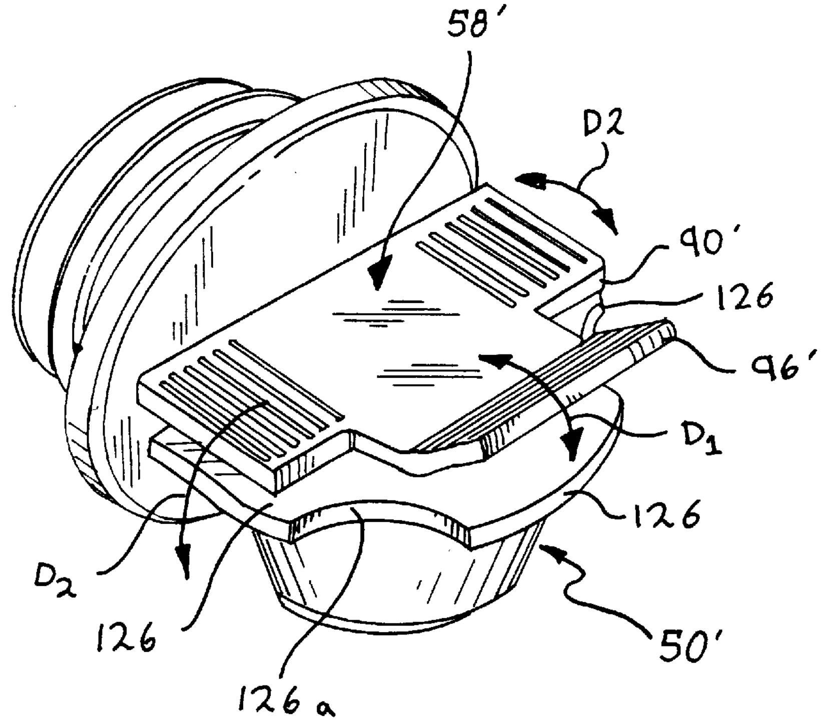
Figure 10:
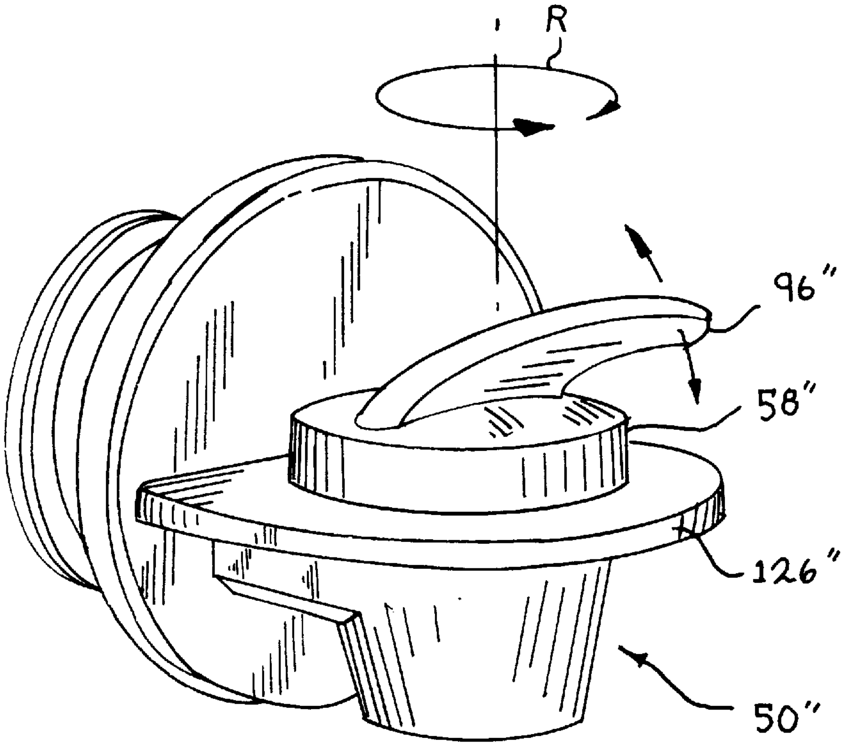
Figure 11:
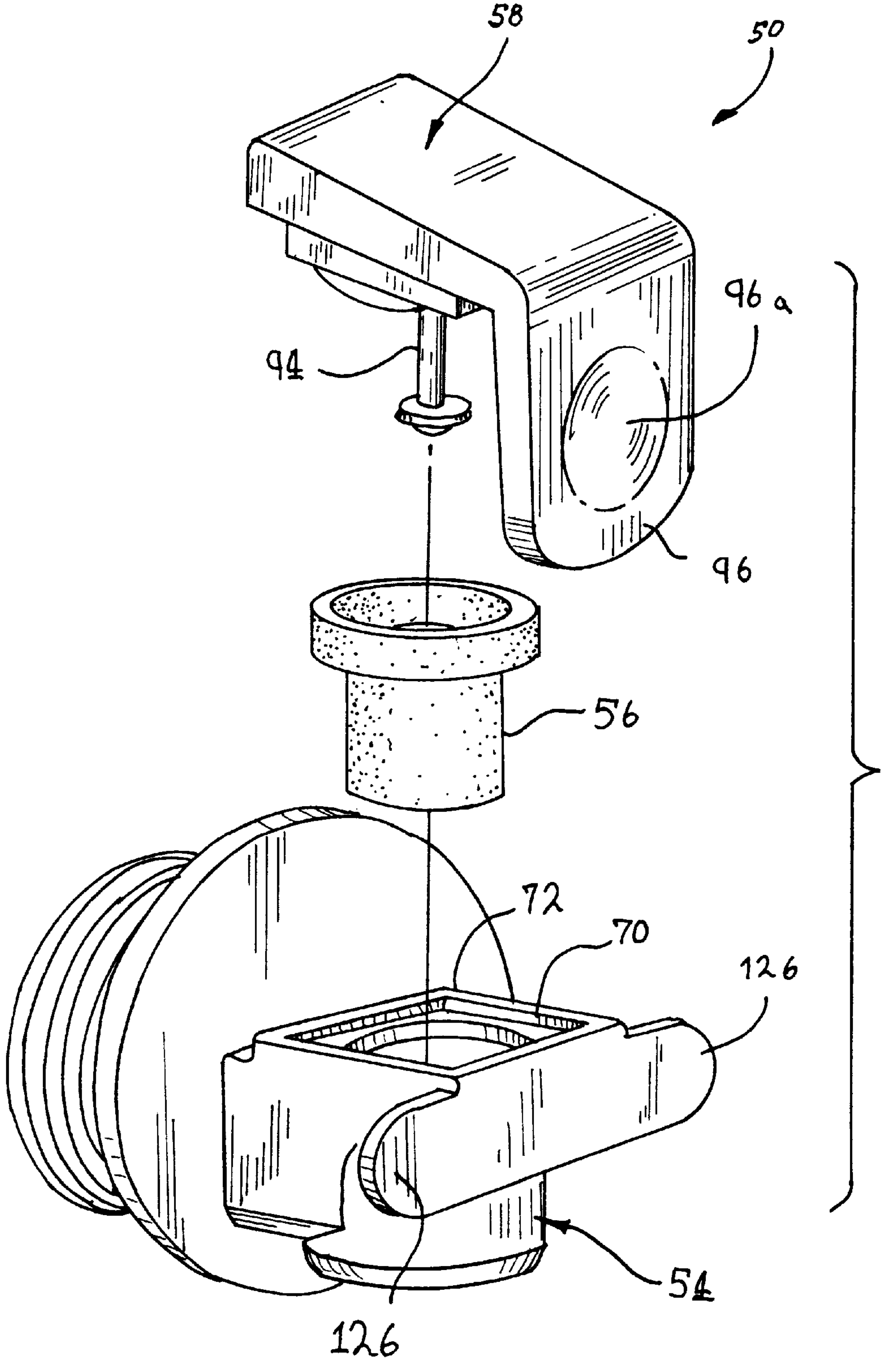
Figure 12:
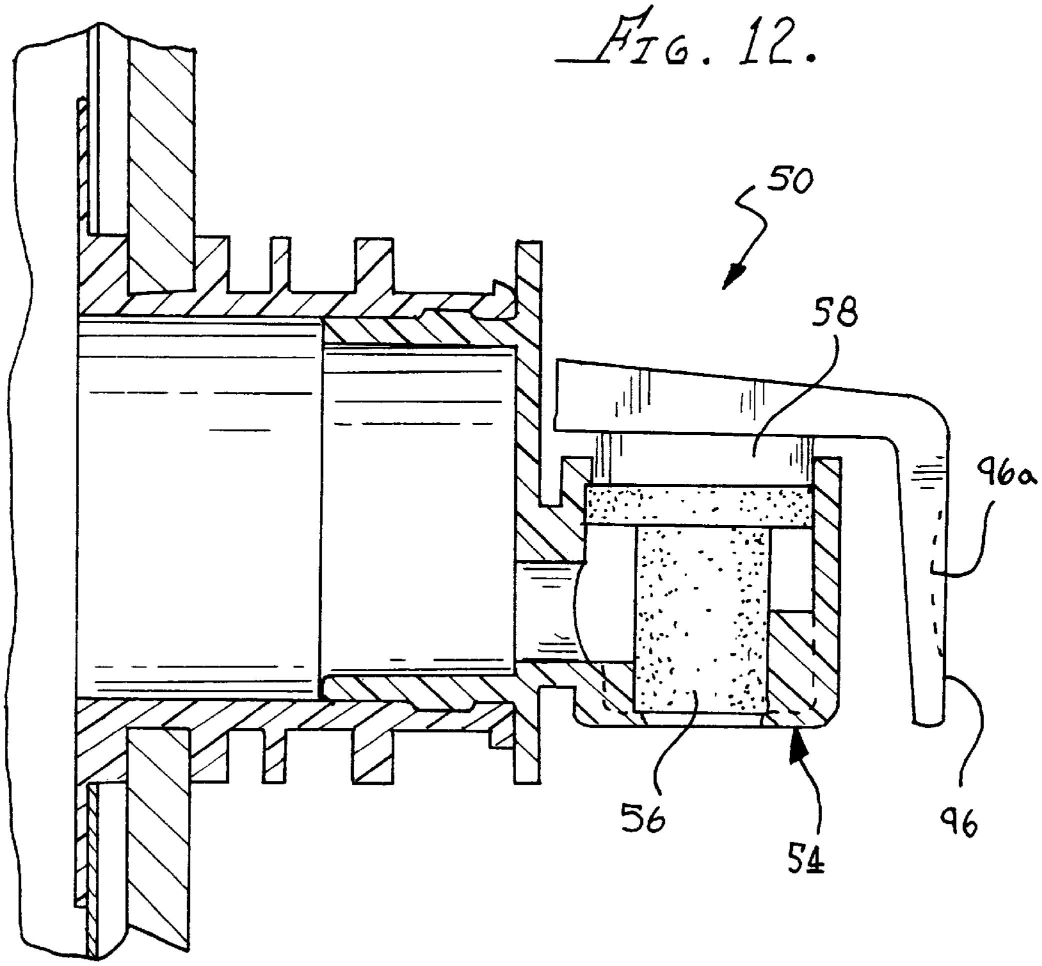
Figure 13:
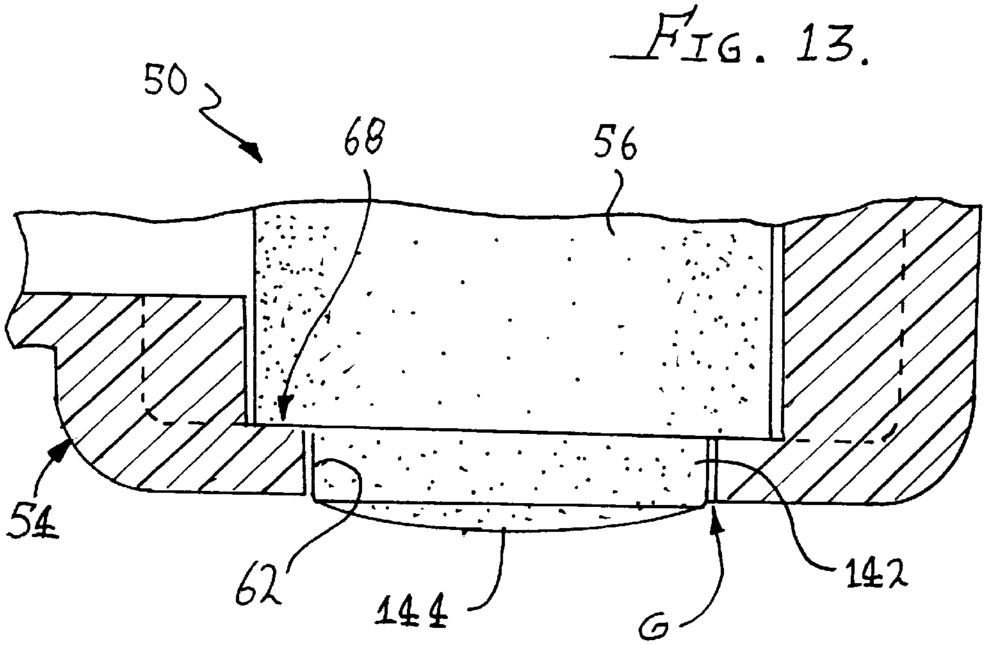

FIG. 2-L is a greatly enlarged fragmentary view of a portion of FIG. 2 showing the tap in cross-section with the tap locked, closed, and preventing liquid from dispensing;

FIG. 2A a cross-sectional view of an alternative exemplary tap presented at a size similar to that of FIG. 2-L, but illustrating the tap when unlocked, opened, and dispensing liquid;

FIG. 3 is an exploded perspective view of the exemplary tap illustrated in FIGS. 1, 2, and 2L;

FIG. 4 is a front elevation view of the exemplary tap of FIGS. 1, 2, and 2-L;

FIG. 5 is a cross-sectional plan view of an exemplary tap taken along line 5—5 of FIG. 4, particularly illustrating internal ribs of the tap;

FIG. 6 is a side elevation view of the exemplary tap seen in FIGS. 1, 2, and 2L, and in its locked, and closed condition preventing dispensing of liquid;

FIG. 7 is a perspective view of the tap according to the alternative embodiment of FIG. 2A;

FIG. 8 is an exploded perspective view of a tap according to yet another alternative embodiment of the invention;

FIG. 9 is a perspective view of the tap illustrated in FIG. 8;

FIG. 10 is a perspective view of a tap according to still another alternative embodiment of the present invention;

FIG. 11 provides an exploded perspective view of a tap according to yet another alternative embodiment of the present invention;

FIG. 12 provides a side elevation view, partially in cross section, of the tap as seen in FIG. 11;

FIG. 13 is a fragmentary cross sectional view at a greatly enlarged size of a tap according to still another alternative embodiment of the present invention; and FIG. 14 is a fragmentary cross sectional view of a feature of the taps of FIGS. 2A, 7, 8, and 9.

DETAILED DESCRIPTION OF EXEMPLARY

Preferred Embodiments of the Invention

An Overview

Viewing first FIG. 1 for an overview of one particular context in which a tap embodying the present invention may be used, the illustrated container 52 is of the bag-in-box configuration. This container 52 includes an outer shape-retaining box 52*a* of corrugated paperboard and an inner flexible bag (not visible in FIG. 1), which is fabricated of plastic sheet. As FIG. 2 illustrates, the container 52 carries a female coupling part 52*b* principally fabricated of a somewhat yieldable, but generally shape-retaining polymer material. This female coupling part is sealingly joined to a collapsible bag 52*c* at an opening of this bag. Thus, the bag 52*c* forms a variable-volume collapsible liquid-holding chamber 122 within the box 52*a*. The bag-in-box construction described for contextual purposes is well-known.

Referring more particularly to FIGS. 1, 2, 3, and 4 of the drawings, an exemplary tap 50 configured in accordance with the teachings of the present invention is illustrated. For purposes of explanation and without limiting the scope of the present invention, exemplary tap 50 is illustrated as a tap for dispensing liquid from a bag-in-box container 52. As such, the tap 50 is in this particularly preferred exemplary embodiment of the invention configured to sealingly interface with the female fitting or coupling part 52*b* carried by the bag 52*c* of the bag-in-box container 52. However, those ordinarily skilled in the pertinent arts will understand that a tap embodying the present invention may be configured differently to interface with other containers, or fluid conduits.

In the present case, the liquid in the container 52 may be wine, although the invention is not so limited. That is, the teachings of the present invention may be readily applied to taps configured for dispensing fluids and liquids of all types from containers of all types, such as from bottles, jugs, or barrels, for example. Also, while the embodiments of the present invention herein presented each have particular features allowing for manual manipulation of an actuator portion of the tap in order to open the tap to allow dispensing of fluid, and to allowing closing of the tap when the manual manipulation is discontinued, these features are not limiting or exhaustive of the invention. For example, an actuator of a tap embodying the present invention may be provided with a wide variety of particular features allowing either or both of manual or mechanical actuation of the tap to controllably dispense fluids or liquids via the tap.

Particularly referring to FIGS. 2, 2L, and 3, and considering the tap 50 in overview, it is seen that the exemplary tap 50 includes a tap body 54 which in this embodiment is mountable to the box part of container 52 as known in the art, a seal member 56 disposed within the tap body 54, and an actuator 58 connected to the seal member 56. With additional reference for a moment now to FIG. 2A (which illustrates an alternative tap embodying the present invention—which actuates similarly to the first embodiment), it is seen that the actuator 58 is pivotally (i.e., tiltingly or rockingly) disposed on the tap body 54 so that when the actuator 54 is manually pivoted by a user, a fluid-tight valving seal formed between the seal member 56 and the tap body 54 is opened or disengaged, allowing liquid within the box 52 to dispense. The tap 50 as shown in FIGS. 1, 2, 2L, 3, 4, and 6 is in a tamper-evident locked condition, which will be further explained, preventing the dispensing of liquid via the tap.

Exemplary tap 50 may be manufactured and assembled with only three elements, that is, the tap body 54, the seal member 56, and the actuator 58, thereby eliminating metallic springs, O rings, and other elements commonly found in conventional valves. In addition, if desired, the actuator 58 may be pivoted in any direction to dispense liquid from the bag-in-box container, which renders the tap 50 very easy to use. These and other features of the present invention will be explained in more detail below.

The tap body 54 includes an inlet 60 which is in communication with liquid-holding chamber 122 within the container 52, and an outlet 62 through which liquid from the chamber 122 is dispensed when the tap 50 is opened. A recess 64 is formed within the tap body 54 and is positioned between the inlet 60 and the outlet 62. The recess 64 has a top opening 66 through which the recess is accessible. A dispensing seat 68 is defined at a bottom of the recess 64 around the outlet 62. The tap body 54 also includes a shoulder 70 which is defined around a perimeter of the opening 66 of the recess 64. The shoulder 70 has a top surface 72 and a bottom surface 74. An annular retaining seat 76 is defined by the bottom surface 74 of the shoulder 70 and is disposed away from the opening 66 of this recess.

The seal member 56 at a sealing portion 80 thereof is slidably disposed within the recess 64. The seal member 56 generally includes a base portion 78, a sealing portion 80, and a resilient portion 82. The base portion 78 is sealingly received inwardly of the recess 64 and against the retaining seat 76, with an end surface 84 of the base portion 76 (best seen in FIG. 2L) abutting the seat 76. Also, an outer surface 86 of the base portion 78 sealingly engages the inner surface of the recess 64 (i.e., an inner circumferentially-extending cylindrical surface) of the recess 64 below the retaining seat 76. Accordingly, a permanent liquid-tight sealing relationship is provided between the seal member 56 and the tap body 54 in the recess 64.

The sealing portion 80 also has an end surface 88 which removably and resiliently contacts or engages the dispensing seat 68 of the tap body 54 in the recess 64. The resilient portion 82 of the seal member 56, which is defined between the base portion 78 and the sealing portion 80, inherently provides a bias force, as indicated by arrow B in FIG. 2, for urging the sealing portion 80 (specifically the end surface 88 thereof), against the dispensing seat 68. This self-biasing property of the resilient portion 82 of the seal member 56 and its effect on the tactile "feel" of operation of the tap 50 will be explained in greater detail below.

Viewing FIGS. 2, 2A, and 7, it is to be noted first of all that FIGS. 2A and 7, illustrate an alternative embodiment of the invention, in which the actuator 58 has a different configuration of handle portions. However, this embodiment in many respects is the same or similar to that of FIGS. 1,2 2L, et. seq., and illustrates the sealing member in its position with the tap opened to dispense liquid. Accordingly, in order to obtain reference numerals for use in describing the embodiment of FIGS. 2A and 7, features which are the same as those of the first embodiment, or which are analogous in structure or function, are indicated on FIGS. 2A and 7 with the same numeral used in FIGS. 1, and 2, and related Figures, and having a prime (') added thereto. However, because of the similarity of the first and second embodiments, the use of the primed reference numerals seen in FIGS. 2A and 7, is not repeated here in the text except as necessary to point out or distinguish particular features of this second embodiment.

Thus, viewing FIG. 2A, it is seen that in order to provide means for manual movement of this actuator 58 it includes a generally part-circular (i.e., in plan view) handle 90 which can be manually manipulated by a user to dispense liquid from the container 52 via the tap 50. The actuator 58 has a pivotal (i.e., tiltingly or rockingly movable, generally in a vertical plane) annular seat 92 (92' in FIG. 2A) which is movably disposed on the top surface 72 of the shoulder 70. An integral stem 94 of the actuator 58 extends downward into the recess 64 and is coupled to the seal member 56 (i.e., to the sealing portion 80), which will also be explained in more detail below.

Referring to FIG. 2A, the actuator 58 is able to pivot on the pivotal seat 92, with the shoulder 70 providing a fulcrum, as indicated by the arrowed point F, when the handle 90 is moved in either one of several predetermined directions (e.g., as are indicated by arrows $D_1$ shown on FIGS. 2 and 2L, and 2A). It will be noted that the manual actuation force illustrated by arrow $D_1$ may be applied anywhere around the available perimeter of the handle 90 (i.e., as is seen in FIG. 1 to be part circular in plan view) so that a considerable convenience of use is provided for the tap 50. The generally centrally disposed portion of the actuator 58 to which the stem 94 is attached consequently moves upward, as indicated by arrow D3 on FIG. 2A. The stem 94 accordingly pulls the sealing portion 80 of the seal member 56 away from the dispensing seat 68 against the inherent bias force B of the resilient portion 82, thereby allowing liquid to flow from the inlet 60 through the outlet 62, as indicated by the downwardly directed arrows in FIGS. 2 and 2A.

When the handle 90 is released by the user, the resilient portion 82 of the seal member 56 by reason of its own inherent resilience urges the sealing portion 80 toward and into sealing engagement with the dispensing seat 68 to seal the outlet 62, thus stopping the flow of liquid from this outlet. Accordingly, it is seen that the seal member 56 may be selectively moved manually between a closed position in which liquid is prevented from dispensing, as shown in FIG. 2, and an opened position in which liquid dispenses, as shown in FIG. 2A. When manual actuation force is discontinued, the seal member 56 tends to move by its own resilience back to a sealing position closing fluid flow from the tap 50. To facilitate the pivoting motion of the actuator 56, the pivotal seat 92 preferably includes an arcuate circumferentially extending and radially outwardly opening, or radially outwardly and downwardly opening, depression 95 which engages the shoulder 70 as the actuator is pivoted in rocking or tilting motion between the closed and opened positions (viewing FIGS. 2L and 2A, respectively).

As can be seen in FIG. 1 and as indicated by axis A in FIGS. 2 and 2A, portions of the tap body 54, the seal member 56, and the actuator 58 are preferably circular in plan view or cylindrical in configuration. More specifically, the opening 66 and the dispensing seat 68 of the recess 64 and the retaining seat 74 of the shoulder 70 may be substantially cylindrical in configuration—although as will be seen, they need not be circular in plan view. The top surface 72 of the shoulder 70 therefore provides a 360° fulcrum on which the pivotal seat 92 may pivot. In the embodiment of FIGS. 1, 2, 2L, 3, 4, and 6, the actuator is not provided with a full 360° handle portion. Rather, in this embodiment, the handle portion has an extent of somewhat more than 180° in plan view, although the invention is not so limited. In other words, the tap could be provided with a handle portion that is fully circular in plan view, if desired. The embodiment of FIG. 1, et seq., is merely somewhat shortened horizontally, as is seen in FIG. 2, to dispose the handle portion closer to the front wall of the box 52, and uses a handle portion of less than 360° as a consequence.

Accordingly, further considering the first embodiment of the tap, a user may urge the handle 90 downward (i.e., in direction $D_1$) at any location along the perimeter of this handle portion in order to pivot the actuator 58 to dispense liquid from the tap. Alternatively, as is seen in FIGS. 1, 2, 2-L, and 3, for example, the actuator 58 may include also (or alternatively, only) an upwardly protruding auxiliary handle 96 which may be urged in another predetermined direction (in this case horizontally toward the box 52), as indicated by arrow $D_2$, to pivot the actuator to dispense liquid from the box 52. Although predetermined direction $D_2$ is illustrated in FIG. 2 to be substantially perpendicular to and toward the face of the box 52, the predetermined direction $D_2$ for application to a handle such as handle 96 may be any direction defined generally in a horizontal plane and radially from axis A (that is, any generally horizontal direction along the possible 360° of sweep radiating from axis A). This allows a user to push or pull the handle 96, or to tip it to either side or in any other direction the user wishes.

Complementary to the exemplary circular configurations of the recess 64 and the shoulder 70 shown in FIGS. 1 and 2, the base portion 78, the sealing portion 80, and the resilient portion 82 of the seal member 56 may also have annular configurations centered about axis A. Accordingly, annular base portion 78 and annular sealing portion 80 respectively correspond to and complement annular retaining seat 76 and annular dispensing seat 68. Regardless of what direction of tipping movement may be effected by the user of the tap 50, the sealing portion of the seal member is guided by the ribs 98 (to be further described below) so that it remains in alignment with its seat in the body 54. In addition, the pivotal seat 92 and the arcuate depression 95 may be annular in configuration to complement the configuration of the shoulder 70. Although exemplary tap 50 illustrated in FIGS. 1 and 2 embodies generally circular cylindrical configurations of a number of elements, taps of the present invention will be seen to employ other configurations for these elements, such as rectilinear, which will be discussed in more detail below.

With continued referencing to FIGS. 2 and 2A and with additional reference to FIG. 5, the recess 64 of the tap body 54 of exemplary tap 50 includes a plurality of ribs 98 for restraining and/or guiding the sealing portion 80 of the seal member 56 in such a manner that the sealing portion 80 moves substantially only axially when the handle 90 (or auxiliary handle 96) is actuated. The ribs 98 are disposed radially around the inner surface of the recess 64 about outlet opening 62. Additionally, the ribs 98 are disposed in a circumferentially spaced relationship within the recess 64 so that liquid is able to readily pass from the inlet 60 and between these ribs to the outlet 62 when the actuator 58 is pivoted. It will be understood that the ribs 98 of the present embodiments of the invention are exemplary only, and that other expedients for guiding the axial movement or reciprocation of the sealing portion 80 of the seal member 56 may be utilized. For example, the seal member 56 itself could possibly carry a radially extending collar or radially extending set of ribs, which slidably engage a cylindrical surface of recess 64 in order to guide the sealing portion of the seal member 56.

To facilitate the pivoting action of the actuator 58, the stem 94 is flexible and able to bend when the handle 90 (or 96) is depressed or moved by a user as described, as shown in FIG. 2A, although the invention is not so limited. That is, while the present embodiments all employ a stem portion that is flexible and does flex as the tap is changed between its opened and closed positions, the stem of alternative embodiments within the scope of this invention need not all flex. That is, the stem of those embodiments may be made short enough that the lateral movement of the lower end of this stem which is occasioned by opening of the tap can be accommodated by slight lateral movement of the head of this stem within the recess of the seal member.

In the present embodiments, the stem 94 is preferably made from flexible and resilient material such as rubber or a flexible polymer material. Materials such as polyethylene, polypropylene, Delrin, and Nylon are commonly known materials, and these as well as other materials may be used to form the actuator and stem 94. Alternatively or in addition thereto, the stem 94 may include annular notches 100 which compress along one side of the stem 94 and correspondingly expand along the other side of the stem 94 when the actuator 58 pivots. Thus, these notches 100 provide an area of increased flexibility in the stem 94, easing the lateral guiding force necessary from the ribs 98 in order to guide the sealing portion 80. Still alternatively, the stem 94 may include a hinging mechanism, such as a ball and socket joint. Salient in consideration of the step 94 is that it pulls up on the seal member so that the sealing portion of this seal member disengages from the dispensing seat when the actuator is rocked or moved in a dispensing direction by a user of the tap.

As mentioned above, the stem 94 is coupled to the seal member 56 at the sealing portion 80 thereof. Although those skilled in the art may determine many suitable approaches at effecting this coupling, an exemplary approach illustrated in the drawings is to provide a button-head anchor 102 at a lower end of the stem 94 and a complementary-shaped retaining recess 104 within the seal member 56 (particularly viewing FIG. 2-L). A resilient collar 106 may be provided at a top portion of the retaining recess 104. As particularly shown in FIG. 2-L, an outer diameter of the anchor 102 is larger than an inner diameter of the collar 106 to retain the anchor 102 within the retaining recess 104. The seal member 56, and particularly the collar 106, of this seal member are made from resilient material so that the anchor 102 of the stem 94 may be urged past the collar 106 and into the retaining recess 104 when manufacturing the tap 50. As is explained, preferably the seal member 56 is integrally made entirely of a resilient material so that all parts of this seal member exhibit the desired resilience. Again, in this regard, it is seen that the anchor is somewhat button-head shaped, and the recess 104 is complementary in shape. Thus, the button-head anchor 102 is snapped into the recess, and is there retained by the collar portion of the seal member 56.

Further, in this regard, the seal member 56 is preferably a unitary element formed or molded from resilient material such as natural or synthetic rubber. This resiliency enables the resilient portion 82 of the seal member 56 to provide the biasing force B to continually urge the sealing portion 80 toward the dispensing seat 68 of the recess 64. As shown in FIGS. 2 and 2-L, the resilient portion 82 may include a first annular bend 108 positioned below the base portion 78 and a second and opposite annular bend 110 positioned between the first bend 108 and the sealing portion 80. The first bend 108 is configured to bend in a first direction and the second bend 110 is configured to bend in a second opposite direction when the actuator 58 pivots and the stem 94 pulls the sealing portion 80 upward.

More specifically, as comparing FIGS. 2L and 2A, the two bends 108 and 110 are radially offset from each other and bend in complementary directions (for example, in an upward direction and a downward direction, respectively) to allow the resilient portion 82 to collapse and/or compress at one side slightly more than on the other diametrically opposite side while actuating force is manually applied by the user on the handle 90, or to the handle 96, for example. Because of its resilient nature, the resilient portion 82 continues to apply biasing force B when compressed so that when the user releases the handle 90 or 96, the seal member 56 returns by its own resilience from the opened position shown in FIG. 2A to the closed positioned shown in FIG. 2. To provide an initial bias force when producing the tap 50, the resilient portion 82 may be slightly compressed or distorted in order for the seal member 56 to fit within the recess 64 between the retaining seat 76 and the dispensing seat 68. Those ordinarily skilled in the pertinent arts will understand that the resilient portion of seal member 56 need not be arranged with oppositely directed bends, as depicted. For Example, a crowned or semi-spherical configuration for the resilient portion of the seal member 56 may be preferred, and is within the ambit of the present invention.

To further facilitate the dispensing of liquid from the box 52, the tap 50 includes an outer flange 126 in vertically spaced opposing relationship below the handle 90 of the actuator 56. Accordingly, a user may position the handle 90 and the outer flange 126 between a finger and a thumb and squeeze or pinch the handle toward the flange at the location of the applied pinch, as is shown in FIG. 2A. Importantly, it is to be noted that the user has an extent of more than 180° of the handle and flange within which this actuating pinch may be applied so that the user will find the tap easily and ergonomically usable regardless of the position the user happens to be in when dispensing liquid from the tap is desired.

With additional reference to FIGS. 1, 2, 2L, 3, 4, and 6, because many embodiments of the tap 50 which may be used on retail consumer products, for example, perhaps in conjunction with a bag-in-box container like container 52, the tap 50 preferably includes a removable tamper-evident locking strip 128 positioned between the handle 90 and the outer flange 126. When the strip 128 is in place, the handle portion 90 is inaccessible or is locked in a position preventing dispensing of liquid from the container. The strip 128 is preferably molded in unit with the flange 126, and is connected thereto by a frangible feature, such as by a plurality of fine-dimension spaced apart connectors along the interface of the strip and flange 126. These connectors may be fractured manually when the strip is pulled from the tap, but the strip cannot be returned to its as-manufactured condition. Thus, unauthorized tampering with the tap will be evident to a customer for the product in the container 52.

Prior to its removal, the tamper-evident strip 128 prevents the actuator 56 from pivoting, thereby preventing the dispensing of liquid 122 from the box 52. The tamper strip 128 preferably extends around a periphery of the tap 50 to prevent pivoting of the actuator 58 regardless of the direction of the manually applied force, as indicated in FIG. 2. Further, the tamper-evident strip preferably includes a circumferential recess, indicated at arrowed numeral **128*a* which circumferentially embraces the perimeter of the handle portion 90 so as to both prevent access to this handle portion and to prevent if from being moved either upwardly or downwardly to open the tap 50. In the illustrated embodiment of FIGS. 1, 2, 2L, et seq., the recess 128*a* is generally L-shaped to support and shield the periphery of the handle portion 90. However, this recess portion may alternatively be C-shaped to support and shield the periphery of the handle portion 90, and also to prevent the periphery from being accessed and lifted upwardly to open the tap 50 without authorization, perhaps by the use of a fine-dimension pointed objects such as a knife blade. Thus, the tamper evident strip 128 may simply shield the handle portion 90**, or may effectively grasp the periphery of the handle portion to positively prevent its motion until the strip is removed from the tap.

The tamper strip 128 has a tab 130 (best seen in FIG. 3) for grasping by a user to remove the strip 128 from the tap 50. Preferably, a lower margin 128b of the tamper-evident strip will be molded integrally with the body 54, and a frangible connection or thin web of plastic material will connect these two features. Consequently, the user may remove the strip by breaking this frangible connection. Once so broken, the tamper-evident strip cannot be returned by a consumer to its original condition, and the possible unauthorized opening of the tap 50 (or at least the removal of the tamper-evident strip 128) will be immediately apparent to a retail customer.

With particular reference to the alternative embodiment illustrated in FIGS. 2A and 7, exemplary tap 50' includes a guide 132 with an arcuate surface 134 for contacting guiding an edge 136 of the actuator 58' when the latter is pivoted by actuating force applied at the front of the handle portion 90' to fully open the tap. Exemplary guide 132, which may be made from a resilient material, includes a notch 138 formed in a top portion thereof. The notch 138 is configured to releasably engage the edge 136 of the actuator 58 while engaging this actuator sufficiently to hold the tap 50 fully open even after a user discontinues manual actuation force. Accordingly, the actuator 58 may be temporarily retained in the opened position. The edge 136 of the actuator 58 may be disengaged from the notch 138 by urging the top of the guide 132 away from the edge 136, thereby allowing the actuator 58 to return to the closed positioned under the influence of the bias force B. In the embodiment of FIG. 2A, the user need only apply a manual closing force to the back edge of the actuator 58. In this case, tapping the back portion of the actuator 58 with a finger tip would be sufficient to dislodge the actuator 58, allowing the tap 50 to close by itself.

FIGS. 2A and 7 also illustrate an alternative embodiment of the tamper-evident strip 128' in which the strip is disposed adjacent to the shoulder 70', and at the inner perimeter of the handle portion 90'. In this location, the strip 128' prevents tipping motions of the actuator 58 resulting from pinching forces applied to the handle portion 90' and flange 126'. However, it may occur that the handle portion could be forced upwardly to dispense fluid from the container 52. This possibility is prevented by a feature of the strip 128' to be described below.

Another alternative embodiment of the tap of the present invention is illustrated in FIGS. 8, 9, and 14, in which portions of the tap are configured in a substantially rectilinear manner. Elements of the tap shown in these Figures which correspond to those described above are reference with like numerals with the addition of a double prime ("). More specifically, the shoulder 70" may be substantially rectangular or square in configuration, with the pivotal seat 92" configured to complement the configuration of the shoulder 70". The top surface 72" of the shoulder 70" provides a fulcrum around the entire perimeter of the shoulder 70" on which the pivotal seat 92'" is movable. The auxiliary handle 96" may in this case extend forwardly to flare upwardly in spaced opposition to a portion of the flange 126", and may be urged downwardly in predetermined direction $D_1$ to pivot the actuator 58" to dispense liquid (Viewing FIG. 7). Accordingly, the flange portion 126" includes recesses **126*a*** which divide this flange into respective circumferentially spaced portions for a purpose to be explained.

The actuator 58" also includes oppositely extending handle portions 90" which extend laterally and each may be urged in respective predetermined directions $D_2$ (i.e., again, preferably by applying a "pinch" with the thumb and fore finger applied to these extensions and the respective portions of the flange 126') to pivot the actuator 58' to dispense liquid. Because of the square or rectangular configuration of the shoulder 70", direction $D_1$ is substantially perpendicular to directions $D_2$. In this case, the user of the tap 50" may also dispense fluid from the tap by lifting upwardly on any of the handle portions 90" and 96", as is indicated in FIG. 9 by the double-headed arrows.

As shown in FIGS. 8 and 14, the tamper strip 128" may also be an open-sided rectangular shape to complement the shape of the shoulder 70'. Further, this embodiment, the tamper evident strip 128" includes a tooth or circumferentially extending pawl rib **128*c* which is received into a matching groove 58*a* of the actuator 58" so that this actuator may not be moved upwardly without fracturing the attachment 128*b*" of strip 128" at the flange 126"**.

Another alternative embodiment of the tap of the present invention is illustrated in FIG. 10. This embodiment utilizes many of the elements seen in FIGS. 2 and 2-L which are circular in plan view. Elements of the tap shown in FIG. 10 which correspond to those described above are reference with like numerals without the addition of a prime (') because the reader will by now be familiar with these features. However, exemplary tap 50 of FIG. 10 has a handle 96 which is rotatable (as indicated by arrow R) substantially through a full 360°. Thus, the handle 96 may be positioned in any position within its possible full-rotational movement, and there may be actuated by the now-familiar "pinch", or by lifting the handle portion 96.

Yet another alternative embodiment of the present inventive tap is illustrated in FIGS. 11 and 12, in which portions of the tap are again configured in a substantially square or rectangular shape in plan view, as was seen in FIGS. 8 and 9. Elements of the tap shown in these Figures which correspond to those described above are reference with the same numeral used above (i.e., without an added prime ) because these features are familiar to the reader. More specifically, in this embodiment the shoulder 70 is again substantially square or rectangular in plan view, with the pivotal seat 92 configured to complement the configuration of the shoulder 70. The top surface 72 of the shoulder 70 provides a fulcrum around the entire perimeter of the shoulder 70 on which the pivotal seat 92 may pivot. Again, however, because of the complementary square or rectangular configuration of these features, pivoting of the actuator is effectively limited to movement in planes paralleling respective perpendiculars to the sides of the square or rectangular shape of the shoulder 70. The auxiliary handle 96 in this case extends forwardly to flare or turn downwardly, and to extend in spaced relation to the front of the body 54. This handle portion 96 includes a finger recess **96*a*. In this embodiment, the body 54 also defines a pair of laterally extending opposite tabs, which on FIG. 11 are referenced with the familiar numeral 126 because they are provided to react a "pinch" applied by a user of the tap. Thus, this embodiment may be used with the user's hand in a position, with the boucle surface upwardly, and either the left or right hand being used to apply the "pinch" to actuate the tap and dispense liquid. In this case, the pinch is applied along a horizontal force line between the handle 96 and the tabs 126**.

Finally, FIG. 13 illustrates "drip-resistant" feature that may be utilized in any tap according to the alternative embodiments of the invention, as well as in other taps including those which do not embody other features of the present invention. That is, this drip-resistant feature may be used in other valves of similar design and operation. The valve body 54 seen in FIG. 13 defines an outlet 62, which is circular in plan view. The seal member 56 which closes this outlet has a downwardly protruding pintle portion 142 extending downwardly through and somewhat beyond the outlet 62 of body 54. In plan view, the pintle portion 142 is also circular, and is preferably just very slightly smaller in diameter than the outlet 62 to define a gap "G" therewith which is very small. Outwardly of and slightly below the outlet 62, the pintle portion 142 includes an outwardly convex surface 144. This surface 144 may be arcuate as depicted, or alternatively, it may be a semi-conical surface.

After a dispensing operation from a tap 50, as depicted in FIG. 13, when the seal member 56 reengages seat 68, the portion of the seal member inwardly of this seat will be wet with liquid. In the embodiment shown in FIG. 13, the combination of the pintle portion 142 and convex surface 144 substantially reduces dripping from the tap.

Those skilled in the art will understand that the preceding exemplary embodiments of the present invention provide the foundation for numerous alternatives and modifications thereto. For example, rather than mounting to a box-like container having a bag therein, a tap embodying the present invention may be configured to mount to a curved surface or to a spigot or spout common to bottles, jugs, and barrels. These other alternatives and modifications are also within the scope of the present invention. Accordingly, the present invention is not limited to that precisely shown and described herein.

We claim:

1. A tap for dispensing liquid, said tap comprising:

a tap body defining an inlet, an outlet, and a flow path communicating therebetween; a dispensing seat around said outlet; a recess positioned between said inlet and said outlet, said recess defining a part of said flow path, and including an opening outwardly on said body; and a shoulder defined around said opening of said recess and having a top surface;

a resilient seal member disposed within said recess and including a base portion sealingly received in said recess adjacent to said opening thereof, a sealing portion movably engaging sealingly with said dispensing seat, and a resilient portion inherently providing a bias force to urge said sealing portion against said dispensing seat; and an actuator for dispensing liquid from the container upon activation, said actuator including a pivotal seat disposed on said shoulder, and a stem coupling to said seal member to lift said sealing portion off said dispensing seat;

whereby, said actuator pivots at said seat on said shoulder, which shoulder forms a fulcrum such that said stem pulls said sealing portion away from said dispensing seat against said bias force of said resilient portion thereby allowing liquid to flow from said inlet along said flow path and from said outlet.

2. A tap as claimed in claim 1 wherein said recess of said tap body further includes a plurality of ribs for reciprocally guiding said seal member such that said sealing portion moves in a substantially axial direction relative to said recess when said actuator is pivoted.

3. A tap as claimed in claim 1 wherein said shoulder of said tap body has an circular configuration.

4. A tap as claimed in claim 3 wherein said pivotal seat of said actuator has an circular configuration complementary to that of said shoulder.

5. A tap as claimed in claim 4 wherein said actuator has an axis centrally of said recess; said actuator including a handle portion allowing manual tipping movement of said actuator on said body.

6. A tap as claimed in claim 5 wherein said handle portion includes a radially outwardly extending flange which defines at least a portion of a circle in plan view.

7. A tap as claimed in claim 1 wherein said shoulder of said tap body has a rectilinear configuration.

8. A tap as claimed in claim 7 wherein said pivotal seat of said actuator has a rectilinear configuration complementary to that of said shoulder.

9. A tap as claimed in claim 1 further comprising a removable tamper-evident strip, said tamper-evident strip substantially preventing said actuator from pivoting in at least one direction.

10. A tap as claimed in claim 9 wherein said tamper-evident strip includes a recess embracing an outer circumferential edge of said handle portion.

11. A tap as claimed in claim 10 wherein said recess of said tamper-evident strip is L-shaped in cross section.

12. A tap for dispensing liquid, said tap comprising:

a tap body defining an inlet, an outlet, and a flow path communicating therebetween; a dispensing seat around said outlet; a recess positioned between said inlet and said outlet, said recess defining a part of said flow path, and including an opening outwardly on said body; and a shoulder defined around said opening of said recess and having a top surface;

a resilient seal member disposed within said recess and including a base portion sealingly received in said recess adjacent to said opening thereof, a sealing portion movably engaging sealingly with said dispensing seat, and a resilient portion inherently providing a bias force to urge said sealing portion against said dispensing seat; and an actuator for dispensing liquid from the container upon activation, said actuator including a pivotal seat disposed on said shoulder, and a stem coupling to said seal member to lift said sealing portion off said dispensing seat;

whereby, said actuator pivots at said seat on said shoulder, which shoulder forms a fulcrum such that said stem pulls said sealing portion away from said dispensing seat against said bias force of said resilient portion thereby allowing liquid to flow from said inlet along said flow path and from said outlet;

wherein said actuator includes a stem extending into said recess, said stem of said actuator being flexible.

13. A tap as claimed in claim 12 wherein said seal member at said sealing portion defines a recess for receiving a terminal portion of said stem, and said sealing member and said stem defining cooperating means adjacent the terminal portion of said stem and at said recess of said sealing member to couple said stem to said sealing member.

14. A tap for dispensing liquid, said tap comprising:

a tap body defining an inlet, an outlet, and a flow path communicating therebetween; a dispensing seat around said outlet; a recess positioned between said inlet and said outlet, said recess defining a part of said flow path, and including an opening outwardly on said body; and a shoulder defined around said opening of said recess and having a top surface;

a resilient seal member disposed within said recess and including a base portion sealingly received in said recess adjacent to said opening thereof, a sealing portion movably engaging sealingly with said dispensing seat, and a resilient portion inherently providing a bias force to urge said sealing portion against said dispensing seat; and an actuator for dispensing liquid from the container upon activation, said actuator including a pivotal seat disposed on said shoulder, and a stem coupling to said seal member to lift said sealing portion off said dispensing seat;

whereby, said actuator pivots at said seat on said shoulder, which shoulder forms a fulcrum such that said stem pulls said sealing portion away from said dispensing seat against said bias force of said resilient portion thereby allowing liquid to flow from said inlet along said flow path and from said outlet;

wherein said resilient portion of said seal member includes a first bend and an oppositely disposed second bend, said first bend and said second bend distorting in opposite directions as said sealing portion of said seal member is moved from said dispensing seat.

15. A tap for dispensing liquid, said tap comprising:

a tap body defining an inlet, an outlet, and a flow path communicating therebetween; a dispensing seat around said outlet; a recess positioned between said inlet and said outlet, said recess defining a part of said flow path, and including an opening outwardly on said body; and a shoulder defined around said opening of said recess and having a top surface;

a resilient seal member disposed within said recess and including a base portion sealingly received in said recess adjacent to said opening thereof, a sealing portion movably engaging sealingly with said dispensing seat, and a resilient portion inherently providing a bias force to urge said sealing portion against said dispensing seat; and an actuator for dispensing liquid from the container upon activation, said actuator including a pivotal seat disposed on said shoulder, and a stem coupling to said seal member to lift said sealing portion off said dispensing seat;

whereby, said actuator pivots at said seat on said shoulder, which shoulder forms a fulcrum such that said stem pulls said sealing portion away from said dispensing seat against said bias force of said resilient portion thereby allowing liquid to flow from said inlet along said flow path and from said outlet;

wherein said resilient portion of said seal member includes:

a first bend positioned below said base portion; and an opposite second bend positioned between said first bend and said sealing portion;

said first bend being configured to bend in a first direction and said second bend being configured to bend in a second direction when said stem pulls said sealing portion away from said dispensing seat.

16. A tap as claimed 15 wherein said bends are radially offset from each other.

17. A tap for dispensing liquid, said tap comprising:

a tap body defining an inlet, an outlet, and a flow path communicating therebetween; a dispensing seat around said outlet; a recess positioned between said inlet and said outlet, said recess defining a part of said flow path, and including an opening outwardly on said body; and a shoulder defined around said opening of said recess and having a top surface;

a resilient seal member disposed within said recess and including a base portion sealingly received in said recess adjacent to said opening thereof, a sealing portion movably engaging sealingly with said dispensing seat, and a resilient portion inherently providing a bias force to urge said sealing portion against said dispensing seat; and an actuator for dispensing liquid from the container upon activation, said actuator including a pivotal seat disposed on said shoulder, and a stem coupling to said seal member to lift said sealing portion off said dispensing seat;

whereby, said actuator pivots at said seat on said shoulder, which shoulder forms a fulcrum such that said stem pulls said sealing portion away from said dispensing seat against said bias force of said resilient portion thereby allowing liquid to flow from said inlet along said flow path and from said outlet;

wherein said shoulder of said tap body has an circular configuration;

wherein said pivotal seat of said actuator has an circular configuration complementary to that of said shoulder;

wherein said actuator has an axis centrally of said recess; said actuator including a handle portion allowing manual tipping movement of said actuator on said body;

wherein said handle portion includes a radially outwardly extending flange which defines at least a portion of a circle in plan view;

wherein said tap body further includes a radially outwardly extending flange part in vertically spaced opposing relation with said flange of said handle portion; whereby, said actuator is tipable to open said tap by pinching with fingers of said handle portion flange toward said body flange.

18. A tap for dispensing liquid, said tap comprising:

a tap body defining an inlet, an outlet, and a flow path communicating therebetween; a dispensing seat around said outlet; a recess positioned between said inlet and said outlet, said recess defining a part of said flow path, and including an opening outwardly on said body; and a shoulder defined around said opening of said recess and having a top surface;

a resilient seal member disposed within said recess and including a base portion sealingly received in said recess adjacent to said opening thereof, a sealing portion movably engaging sealingly with said dispensing seat, and a resilient portion inherently providing a bias force to urge said sealing portion against said dispensing seat; and an actuator for dispensing liquid from the container upon activation, said actuator including a pivotal seat disposed on said shoulder, and a stem coupling to said seal member to lift said sealing portion off said dispensing seat;

whereby, said actuator pivots at said seat on said shoulder, which shoulder forms a fulcrum such that said stem pulls said sealing portion away from said dispensing seat against said bias force of said resilient portion thereby allowing liquid to flow from said inlet along said flow path and from said outlet;

wherein said shoulder of said tap body has an circular configuration;

wherein said pivotal seat of said actuator has an circular configuration complementary to that of said shoulder;

wherein said actuator has an axis centrally of said recess; said actuator including a handle portion allowing manual tipping movement of said actuator on said body;

in which said handle portion and said actuator are rotational relative to said tap body, said stem rotating relative to said seal member, and said handle portion providing for manual tipping of said actuator in any direction within a full 360° sweep about an axis central of said body recess.

19. A tap for dispensing liquid, said tap comprising:

a tap body defining an inlet, an outlet, and a flow path communicating therebetween; a dispensing seat around said outlet; a recess positioned between said inlet and said outlet, said recess defining a part of said flow path, and including an opening outwardly on said body; and a shoulder defined around said opening of said recess and having a top surface;

a resilient seal member disposed within said recess and including a base portion sealingly received in said recess adjacent to said opening thereof, a sealing portion movably engaging sealingly with said dispensing seat, and a resilient portion inherently providing a bias force to urge said sealing portion against said dispensing seat; and an actuator for dispensing liquid from the container upon activation, said actuator including a pivotal seat disposed on said shoulder, and a stem coupling to said seal member to lift said sealing portion off said dispensing seat;

whereby, said actuator pivots at said seat on said shoulder, which shoulder forms a fulcrum such that said stem pulls said sealing portion away from said dispensing seat against said bias force of said resilient portion thereby allowing liquid to flow from said inlet along said flow path and from said outlet;

wherein said shoulder of said tap body has an circular configuration;

wherein said pivotal seat of said actuator has an circular configuration complementary to that of said shoulder;

wherein said actuator has an axis centrally of said recess; said actuator including a handle portion allowing manual tipping movement of said actuator on said body;

in which said handle portion extends forwardly of said tap body, and a part of said handle portion depends vertically in horizontally spaced relation to said tap body, said tap body including at least one horizontally extending tab in horizontally spaced juxtaposed relation to said handle portion; whereby, said tap is opened by manually applying a pinch to said tab and to the vertical part of said handle portion.

20. A tap as claimed in claim 19 wherein said tap body provides a pair of said tabs extending in opposite directions, whereby said tap is manually opened with either the left or right hand by placing a thumb on said handle and an opposing finger on a selected one of said pair of tabs.

21. A tap for dispensing liquid, said tap comprising:

a tap body defining an inlet, an outlet, and a flow path communicating therebetween; a dispensing seat around said outlet; a recess positioned between said inlet and said outlet, said recess defining a part of said flow path, and including an opening outwardly on said body; and a shoulder defined around said opening of said recess and having a top surface;

a resilient seal member disposed within said recess and including a base portion sealingly received in said recess adjacent to said opening thereof, a sealing portion movably engaging sealingly with said dispensing seat, and a resilient portion inherently providing a bias force to urge said sealing portion against said dispensing seat; and an actuator for dispensing liquid from the container upon activation, said actuator including a pivotal seat disposed on said shoulder, and a stem coupling to said seal member to lift said sealing portion off said dispensing seat;

whereby, said actuator pivots at said seat on said shoulder, which shoulder forms a fulcrum such that said stem pulls said sealing portion away from said dispensing seat against said bias force of said resilient portion thereby allowing liquid to flow from said inlet along said flow path and from said outlet; wherein said shoulder of said tap body has a rectilinear configuration;

wherein said handle portion is movable in predetermined directions to open said tap, and said predetermined directions including first direction and a second direction which are perpendicular with each other.

22. A tap as claimed in claim 21 in which said predetermined directions are each perpendicular to a side of the rectilinear configuration of said shoulder and seat.

23. A tap for dispensing liquid, said tap comprising:

a tap body defining an inlet, an outlet, and a flow path communicating therebetween; a dispensing seat around said outlet; a recess positioned between said inlet and said outlet, said recess defining a part of said flow path, and including an opening outwardly on said body; and a shoulder defined around said opening of said recess and having a top surface;

a resilient seal member disposed within said recess and including a base portion sealingly received in said recess adjacent to said opening thereof, a sealing portion movably engaging sealingly with said dispensing seat, and a resilient portion inherently providing a bias force to urge said sealing portion against said dispensing seat; and an actuator for dispensing liquid from the container upon activation, said actuator including a pivotal seat disposed on said shoulder, and a stem coupling to said seal member to lift said sealing portion off said dispensing seat;

whereby, said actuator pivots at said seat on said shoulder, which shoulder forms a fulcrum such that said stem pulls said sealing portion away from said dispensing seat against said bias force of said resilient portion thereby allowing liquid to flow from said inlet along said flow path and from said outlet;

wherein said pivotal seat of said actuator includes an arcuate depression for engaging the top surface of said shoulder.

24. A tap for dispensing liquid, said tap comprising:

a tap body defining an inlet, an outlet, and a flow path communicating therebetween; a dispensing seat around said outlet; a recess positioned between said inlet and said outlet, said recess defining a part of said flow path, and including an opening outwardly on said body; and a shoulder defined around said opening of said recess and having a top surface;

a resilient seal member disposed within said recess and including a base portion sealingly received in said recess adjacent to said opening thereof, a sealing portion movably engaging sealingly with said dispensing seat, and a resilient portion inherently providing a bias force to urge said sealing portion against said dispensing seat; and an actuator for dispensing liquid from the container upon activation, said actuator including a pivotal seat disposed on said shoulder, and a stem coupling to said seal member to lift said sealing portion off said dispensing seat;

whereby, said actuator pivots at said seat on said shoulder, which shoulder forms a fulcrum such that said stem pulls said sealing portion away from said dispensing seat against said bias force of said resilient portion thereby allowing liquid to flow from said inlet along said flow path and from said outlet;

wherein; said actuator further includes an anchor disposed on a lower end of said stem; and said seal member further includes a retaining recess with a resilient collar for engaging said anchor of said actuator within said recess of said seal member.

25. A tap for dispensing liquid, said tap comprising:

a tap body defining an inlet, an outlet, and a flow path communicating therebetween; a dispensing seat around said outlet; a recess positioned between said inlet and said outlet, said recess defining a part of said flow path, and including an opening outwardly on said body; and a shoulder defined around said opening of said recess and having a top surface;

a resilient seal member disposed within said recess and including a base portion sealingly received in said recess adjacent to said opening thereof, a sealing portion movably engaging sealingly with said dispensing seat, and a resilient portion inherently providing a bias force to urge said sealing portion against said dispensing seat; and an actuator for dispensing liquid from the container upon activation, said actuator including a pivotal seat disposed on said shoulder, and a stem coupling to said seal member to lift said sealing portion off said dispensing seat;

whereby, said actuator pivots at said seat on said shoulder, which shoulder forms a fulcrum such that said stem pulls said sealing portion away from said dispensing seat against said bias force of said resilient portion thereby allowing liquid to flow from said inlet along said flow path and from said outlet;

further comprising a removable tamper-evident strip, said tamper-evident strip substantially preventing said actuator from pivoting in at least one direction;

wherein said tamper-evident strip includes a recess embracing an outer circumferential edge of said handle portion;

wherein said tamper-evident strip includes a circumferential pawl rib engaging into a substantially matching groove defined by said actuator, and said tamper-evident strip joining frangibly to said tap body to prevent tipping motions of said actuator.

26. A tap for dispensing liquid, said tap comprising:

a tap body defining an inlet, an outlet, and a flow path communicating therebetween; a dispensing seat around said outlet; a recess positioned between said inlet and said outlet, said recess defining a part of said flow path, and including an opening outwardly on said body; and a shoulder defined around said opening of said recess and having a top surface;

a resilient seal member disposed within said recess and including a base portion sealingly received in said recess adjacent to said opening thereof, a sealing portion movably engaging sealingly with said dispensing seat, and a resilient portion inherently providing a bias force to urge said sealing portion against said dispensing seat; and an actuator for dispensing liquid from the container upon activation, said actuator including a pivotal seat disposed on said shoulder, and a stem coupling to said seal member to lift said sealing portion off said dispensing seat;

whereby, said actuator pivots at said seat on said shoulder, which shoulder forms a fulcrum such that said stem pulls said sealing portion away from said dispensing seat against said bias force of said resilient portion thereby allowing liquid to flow from said inlet along said flow path and from said outlet;

wherein said handle portion includes a handle part extending in spaced relationship to a projecting flange part of said body, whereby a user of the tap can move the actuator to dispense liquid by applying a "pinch" to the handle part and body flange part.

27. A container-and-tap combination for holding and dispensing liquid, comprising:

a container for holding liquid and including a wall and a liquid outlet;

a tap for dispensing said liquid from said container via said container outlet, said tap including: a tap body mounted to said wall of said container at said container outlet, said tap body defining an inlet communicating liquid from said container outlet, an outlet, a flow path extending from the tap inlet to the tap outlet, a recess defining a part of said flow path and defining an opening outwardly on said tap body, a dispensing seat defined around said outlet, and a shoulder defined around said opening;

a seal member disposed within said recess and including: a base portion sealingly received within said recess adjacent to said opening thereof, a sealing portion sealingly and removably engaging said dispensing seat, a resilient portion between said base and sealing portions and providing a bias force to urge said sealing portion against said dispensing seat; and an actuator for dispensing liquid from the container upon activation and including: a handle portion movable in at least one predetermined direction, a pivotal seat disposed on said shoulder and carrying said handle portion, a stem extending from said actuator within said shoulder and coupling to said seal member;

whereby, said actuator pivoting on said pivotal seat with said shoulder provides a fulcrum so that movement of said handle in said predetermined direction pulls said stem to move said sealing portion away from said dispensing seat thereby allowing liquid to flow from said container into said inlet and from said outlet.

28. A combination as claimed in claim 27 further comprising a flexible inner bag disposed within said container, said inner bag holding said liquid.

29. A method for controllably dispensing liquid from a container and tap combination, said method comprising steps of:

providing a container for holding liquid and including a wall and a liquid outlet;

providing a tap for dispensing the liquid from the container via the container liquid outlet, configuring the tap to include a tap body sealingly mounting to the wall of the container at the container liquid outlet, utilizing the tap body to define:

- an inlet receiving communication of liquid from the container liquid outlet,
- a tap outlet,
- a flow path extending from the tap inlet to the tap outlet,
- a recess defining a part of the flow path and defining an opening outwardly on the tap body,
- a dispensing seat defined around the tap outlet, and
- a shoulder defined around the opening;

providing a seal member disposed within the recess and configuring the seal member to include:

- a base portion sealingly received within the recess adjacent to the opening thereof,
- a sealing portion sealingly and removably engaging the dispensing seat,
- a resilient portion between the base and sealing portions and providing a bias force to urge the sealing portion against the dispensing seat;

providing an actuator for dispensing liquid from the container upon activation and including:

- a handle portion movable in at least one predetermined direction,
- a pivotal seat disposed on the shoulder and carrying the handle portion,
- a stem extending from the actuator within the shoulder and coupling to the seal member;

providing for the actuator to pivot on the pivotal seat with the shoulder providing a fulcrum so that movement of the handle in the predetermined direction pulls the stem to move the sealing portion away from the dispensing seat thereby allowing liquid to flow from the container into the inlet and from the outlet;

moving the handle in the predetermined direction; and releasing the handle to allow the seal portion of the seal member to sealingly engage the dispensing seat because of the resilient bias of the seal member.

30. A method for controllably dispensing liquid from a container and tap combination, said method comprising steps of:

providing a container for holding liquid and including a wall and a liquid outlet;

providing a tap for dispensing the liquid from the container via the container liquid outlet, configuring the tap to include a tap body sealingly mounting to the wall of the container at the container liquid outlet, utilizing the tap body to define:

an inlet receiving communication of liquid from the container liquid outlet, a tap outlet, a flow path extending from the tap inlet to the tap outlet, a recess defining a part of the flow path and defining an opening outwardly on the tap body, a dispensing seat defined around the tap outlet, and a shoulder defined around the opening;

providing a seal member disposed within the recess and configuring the seal member to include:

a base portion sealingly received within the recess adjacent to the opening thereof, a sealing portion sealingly and removably engaging the dispensing seat, a resilient portion between the base and sealing portions and providing a bias force to urge the sealing portion against the dispensing seat;

providing an actuator for dispensing liquid from the container upon activation and including:

a handle portion movable in at least one predetermined direction, a pivotal seat disposed on the shoulder and carrying the handle portion, a stem extending from the actuator within the shoulder and coupling to the seal member;

providing for the actuator to pivot on the pivotal seat with the shoulder providing a fulcrum so that movement of the handle in the predetermined direction pulls the stem to move the sealing portion away from the dispensing seat thereby allowing liquid to flow from the container into the inlet and from the outlet;

moving the handle in the predetermined direction; and releasing the handle to allow the seal portion of the seal member to sealingly engage the dispensing seat because of the resilient bias of the seal member;

moving the handle in a second direction which is different than the predetermined direction; and utilizing the movement of the handle portion in the second direction to also open the tap and dispense liquid from the container.

31. A drip-resistant tap for dispensing liquid, said tap comprising: a tap body defining an inlet, and outlet and a flow path extending therebetween, said tap body defining a seating surface circumscribing said flow path adjacent to said outlet, and a recess positioned between said inlet and said outlet and leading to said seating surface; a seal member disposed within said recess and including a sealing portion engageable with said sealing surface; and said sealing portion of said seal member further including a pintle portion extending though said outlet and defining a small radial gap with said outlet.

32. A tap for dispensing liquid, said tap comprising:

a tap body defining an inlet, an outlet, and a flow path communicating therebetween; a dispensing seat around said outlet; a recess positioned between said inlet and said outlet and having an axis, said recess defining a part of said flow path, and including an opening outwardly on said body;

a resilient seal member disposed within said recess and including a base portion sealingly received in said recess adjacent to said opening thereof, a sealing portion movably engaging sealingly with said dispensing seat, and a resilient portion inherently providing a bias force to urge said sealing portion against said dispensing seat;

actuating means for receiving an operator input and responsively moving said sealing portion of said seal member between a first position in which said sealing portion sealingly engages onto said dispensing seat, and a second position in which said actuating means moves said sealing portion from said dispensing seat to allow liquid flow along said flow path from said inlet to said outlet; and one of said seal member and said body defining cooperating means for guiding said sealing portion in reciprocation between said first and said second positions substantially along said axis of said recess.

33. A tap for dispensing liquid, said tap comprising:

a tap body defining an inlet, an outlet, and a flow path communicating therebetween; a dispensing seat around said outlet; a recess positioned between said inlet and said outlet and having an axis, said recess defining a part of said flow path, and including an opening outwardly on said body;

a resilient seal member disposed within said recess and including a base portion sealingly received in said recess adjacent to said opening thereof, a sealing portion movably engaging sealingly with said dispensing seat, and a resilient portion inherently providing a bias force to urge said sealing portion against said dispensing seat;

actuating means for receiving an operator input and responsively moving said sealing portion of said seal member between a first position in which said sealing portion sealingly engages onto said dispensing seat, and a second position in which said actuating means moves said sealing portion from said dispensing seat to allow liquid flow along said flow path from said inlet to said outlet; and one of said seal member and said body defining cooperating means for guiding said sealing portion in reciprocation between said first and said second positions substantially along said axis of said recess;

wherein said tap body further defines a shoulder around said opening of said recess, said shoulder having a top surface;

said actuating means including an actuator member including a pivot seat generally matching said shoulder in configuration and pivotally engaging upon said shoulder to allow said actuator to tip relative to said tap body, and said actuator member and said seal member defining cooperative coupling means for moving said sealing portion between said first and said second positions in response to tipping of said actuator member;

whereby, said actuator member pivots at said seat on said shoulder, which shoulder forms a fulcrum such that said coupling means pulls said sealing portion away from said dispensing seat against said bias force of said resilient portion thereby allowing liquid to flow from said inlet along said flow path and from said outlet.

34. A tap as claimed in claim 33 wherein said actuator includes a stem extending into said recess, said stem of said actuator being flexible.

35. A tap as claimed in claim 33 wherein said coupling means includes said seal member at said sealing portion defining a recess for receiving a terminal portion of said stem and said stem defining a head at the terminal portion of said stem which head is receivable into said recess to couple said stem to said seal member.

36. A tap as claimed in claim 33 wherein said cooperative means for guiding includes a plurality of ribs carried by said tap body in said recess, said plurality of ribs being circumferentially arrayed about said dispensing seat and slidably engaging said sealing portion for reciprocally guiding said seal member such that said sealing portion moves in a substantially axial direction relative to said recess when the latter moves between said first and said second positions.

37. A method for dispensing liquid from a container via a tap, said method including the steps of:

providing a tap body defining an inlet, and outlet, a dispensing seat about said outlet, a flow path communicating said inlet with said outlet, and a recess forming a part of said flow path and having an opening outwardly on said tap body;

disposing a seal member in said recess, with a base portion sealingly engaging said tap body within said recess and adjacent to said opening; in a first position of said seal member a sealing portion of said seal member biasing into removable sealing engagement with said dispensing seat, said seal member in a second position disposing said sealing portion away from said dispensing seat to allow liquid flow from said container along said flow path and from said outlet;

providing an actuator for moving said seal member between said first and said second positions while simultaneously applying a lateral force to said sealing portion; and providing cooperating means for guiding said seal portion in reciprocation substantially along an axis of said recess between said first and said second positions of said seal member.

38. The method of claim 37 further including the step of utilizing an actuator which pivotally engages said tap body.

* * * * *